(12) United States Patent
Taylor et al.

(10) Patent No.: US 7,385,509 B2
(45) Date of Patent: *Jun. 10, 2008

(54) MANUFACTURED ARTICLE RECOVERY SYSTEM

(75) Inventors: Stanton J. Taylor, Green Oaks, IL (US); Iain D. Lopata, Deerfield, IL (US)

(73) Assignee: Accentures Global Services GmbH (CH)

( * ) Notice: Subject to any disclaimer, the term of this patent is extended or adjusted under 35 U.S.C. 154(b) by 251 days.

This patent is subject to a terminal disclaimer.

(21) Appl. No.: 11/248,086

(22) Filed: Oct. 12, 2005

(65) Prior Publication Data

US 2006/0028343 A1    Feb. 9, 2006

Related U.S. Application Data

(63) Continuation of application No. 10/639,574, filed on Aug. 11, 2003, now Pat. No. 6,967,577.

(51) Int. Cl.
*G08B 13/14* (2006.01)

(52) U.S. Cl. .................. 340/572.1; 340/10.1; 707/3; 235/375

(58) Field of Classification Search .............. 340/572.1
See application file for complete search history.

(56) References Cited

U.S. PATENT DOCUMENTS 6,259,367 B1 * 7/2001 Klein ...................... 340/572.1
6,275,153 B1   8/2001 Brooks
6,496,112 B1 * 12/2002 Vega ..................... 340/572.1
6,774,811 B2 * 8/2004 Kaufman et al. ....... 340/825.49
2002/0014955 A1   2/2002 Klitsgarrd
2003/0095032 A1 * 5/2003 Hoshino et al. ............ 340/5.92
2003/0189094 A1 * 10/2003 Trabitz ..................... 235/385
2003/0214404 A1 * 11/2003 Thomas ................ 340/539.32
2004/0124982 A1 * 7/2004 Kovach ................... 340/572.1

FOREIGN PATENT DOCUMENTS

FR           2 778 987 A1    11/1999
WO      WO 02/084615 A1    10/2002

* cited by examiner

*Primary Examiner*—George Bugg
(74) *Attorney, Agent, or Firm*—Brinks Hofer Gilson & Lione (57) ABSTRACT

A system for recovering a manufactured article is disclosed. The system includes an electronic reader that reads a unique code associated with the manufactured article when that article is within range of the reader. The unique code may be based on a radio-frequency identification (RFID) tag positioned with the manufactured article. The reader may be positioned with a facility associated with retrieval of misplaced or reposed consumer items, or within a community. A database may store records of unique codes and information related to owners of manufactured articles. The database may be downloaded to a local cache. The database also may be queried based on the unique code. The owner of the item may be determined based on a match of a unique code read by the reader to a record in the database. The database may be accessed through an open-network connection to a computerized network.

20 Claims, 8 Drawing Sheets

MANUFACTURED ARTICLE RECOVERY SYSTEM

PRIORITY AND CROSS REFERENCE TO RELATED APPLICATION

This is a continuation of U.S. application Ser. No. 10/639,574 filed Aug. 11, 2003 (U.S. Pat. No.,6,967,577), which is incorporated by reference herein in its entirety.

BACKGROUND OF THE INVENTION

1. Related Field

The present invention relates generally to a system for locating, identifying, and recovering a manufactured article. More particularly, the present invention relates to a system using radio-frequency identification tags to recover lost or stolen consumer products.

2. Description of the Related Art

Systems have been developed to more accurately track inventory through a distribution network, or supply chain, and deter theft of items from distribution network. One such system is known as radio frequency identification ("RFID"). The RFID system includes a relatively compact and low-cost label, referred to as an RFID tag, and an RFID reader. The RFID tag includes a small integrated circuit ("IC") for basic communications, and a memory circuit for secure data storage. The data stored in the memory may be read by interrogating the tag with radio-frequency ("RF") signals from the RFID reader.

The RFID tag is affixed to an item, product packaging, or a shipping container. The RFID reader may be positioned at various locations in the supply chain to read an RFID tag as it passes through the supply chain. The RFID reader may be placed at a dock of a manufacturing facility or warehouse, at a shelf on which inventory is stored, proximate a check-out counter, or a point of egress for a store. When the RFID tag passes within range of the RFID reader, the RFID reader reads the data stored on the RFID tag. The data may include a quantity of items, the types of items. Based on the location of the RFID reader and the date or time that the RFID tag was read, the item may be accurately tracked as it moves from manufacturing to the point of sale. If the item turns up missing, the last known location may be determined.

The data stored on the RFID tag is typically useful only to the manufacturer, distributor, or vendor of the item(s). When an item is purchased by a consumer, the data on the RFID tag may be disabled or erased by the retailer. An RFID tag that is affixed to the product packaging is usually discarded after the purchase of the item. Even if the RFID tag is not disabled, erased or discarded, the data stored by the tag may not have any relevance to the consumer of the item since it relates to tracking of the item through the supply chain.

Although efforts have been made to use technology in the theft-deterrent area, little has been done to make use of technology to improve the recovery of stolen or lost manufactured items. In addition to the costs of the loss of the item to the owner, insurers and law enforcement agencies incur costs associated with not being able to identify the owner of the mislaid or misappropriated item. A law enforcement agency that reclaims a stolen item often has little means for verifying or identifying the owner of the reclaimed item. Automobiles may be an exception because they are traceable to their owners through the Vehicle Identification Numbers (VIN) attached to the automobiles and registered with the state motor vehicle agencies. However, obtaining the VIN, sending it to an appropriate department to manually input the number in a state computer system and transmitting the identification of an owner to the appropriate personnel is often time-consuming and labor intensive. A similar system for low-cost consumer goods has heretofore been uneconomical or impracticable on a wide-scale. Attempts to replicate this system on a voluntary basis with lower cost manufactured items, such as bicycles, for example, have not met with wide scale success. This is likely attributed to, on the one hand, the labor-intensive requirements on part of the consumer to manually affix a permanent number on the bicycle, such as by engraving, and then register the number with the appropriate community organization, and, on the other hand, the consumer's belief in the low likelihood of a bicycle being identified as stolen and recovered by the local police authorities.

In urban areas, for examples, law enforcement agencies may not have sufficient resources to collect and search records for the many recovered items. Identification of the owners of unregistered consumer items is often labor intensive, and rarely results in the items being returned to the rightful owner. Consequently, the reclaimed item may be stored in an impound or a "lost and found" collection. The lost or stolen item, although reclaimed by the law enforcement agency, may be deemed a complete loss by an insurer who may consequently be obligated to reimburse the owner for the replacement cost of the item. Such reimbursement may not otherwise be necessary if the owner could be identified in a cost-efficient manner at a fraction of the value of the consumer good. While use of RFID systems have been implemented in a controlled environment where known quantities of items travel through known destinations in known timeframes under the control of a single authority, such as a manufacturer, warehouse, vendor or retailer, no one has heretofore overcome the technical challenges applying RFID technology to an infrastructure that requires collecting, arranging, tracking, searching, and accessing data for numerous items of various owners and that may rely upon efforts of multiple independent entities.

Accordingly, there is a need for implementing a technological solution for identifying and recovering a mislaid or misappropriated manufactured article.

BRIEF SUMMARY OF THE INVENTION

The invention solves the above problems by incorporating advantages of RFID technology in the area of recovery of lost, mislaid, misplaced misappropriated, manufactured articles. The invention provides a system for collecting, storing and managing information associated with the ownership of manufactured articles. Based on the stored information, an owner of a lost or stolen article may be easily identified, and the article recovered by the owner. A lost or stolen article also may be easily identified based on the stored information.

One embodiment of the manufactured article recovery system includes a radio-frequency identification ("RFID") tag, an RFID reader or interrogator, and a searchable database. The RFID tag stores a machine-readable unique identification code that may be read by the RFID reader when the manufactured article is within range of the RFID reader. The searchable database includes records of unique identification codes and information that identifies the owner of the manufactured item associated with the corresponding RFID tag. The database may also include information as to the status of whether a manufactured item associated with the record is mislaid or misappropriated. The RFID reader is positioned in a location where it may passively read the RFID tag on a manufactured article that has been lost or stolen. The RFID reader may read the RFID tag without requiring human intervention to initiate the reading of the RFID tag.

The RFID tag is associated with a manufactured article by affixing or otherwise disposing a RFID tag to the manufactured article and recording the unique identification code of the tag and information associated with the owner in a searchable database. The manufactured article may be a consumer item, an item of personal property, an item of business equipment, an item of inventory, or the like. The RFID tag may be presented to the owner of the manufactured article by an RFID tag issuing authority that maintains the searchable database.

The RFID reader may have a memory or cache for storing unique identification codes and other information downloaded from the database. When the item to which the RFID tag is affixed is within range of the RFID reader, the RFID reader interrogates the RFID tag and receives information related to the unique identification number stored by the RFID tag. The cache may be searched for a matching unique identification code. If a match is located, the item with the RFID tag that was interrogated may be identified as mislaid or misappropriated. The owner may be identified based on corresponding information stored in the database. The owner also may be determined by locating the matched unique identification code in the database and reading the information identifying the owner.

The RFID reader also may instigate a search or a query of the database. The search may be based on the unique identification code and other criteria such as a location of the RFID reader that read the unique identification code. A record corresponding to the unique identification code may be located, and the owner associated with the record corresponding to unique identification code may be determined. An output of the result of the query may be generated and transmitted to the owner.

The record in the database may be created when the RFID tag issuing authority presents the RFID tag to the owner. The owner also may obtain an RFID tag and create a record in the database by registering the RFID tag with a RFID tag issuing authority. The record also may be updated to reflect changes in the status information related to the owner of the consumer item to which the associated RFID is affixed. The record may also be flagged to indicate that the RFID tag associated with the record has been determined to have been misplaced.

The RFID reader may be located at various locations such as with a patrol vehicle for a law enforcement agency, with a patrol person of the law enforcement agency, as a component of a traffic control signal, at a pawnbroker's facility, or at a flea market.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

To give a fuller understanding of the full scope of the present invention, this section describes the manufactured article recovery methodology and embodiments for a system for recovery of a manufactured article in accordance with the present invention. This section describes examples of the preferred embodiments of the invention and exemplary physical hardware and data structures to implement and embody preferred aspects of the invention.

Figure 1:
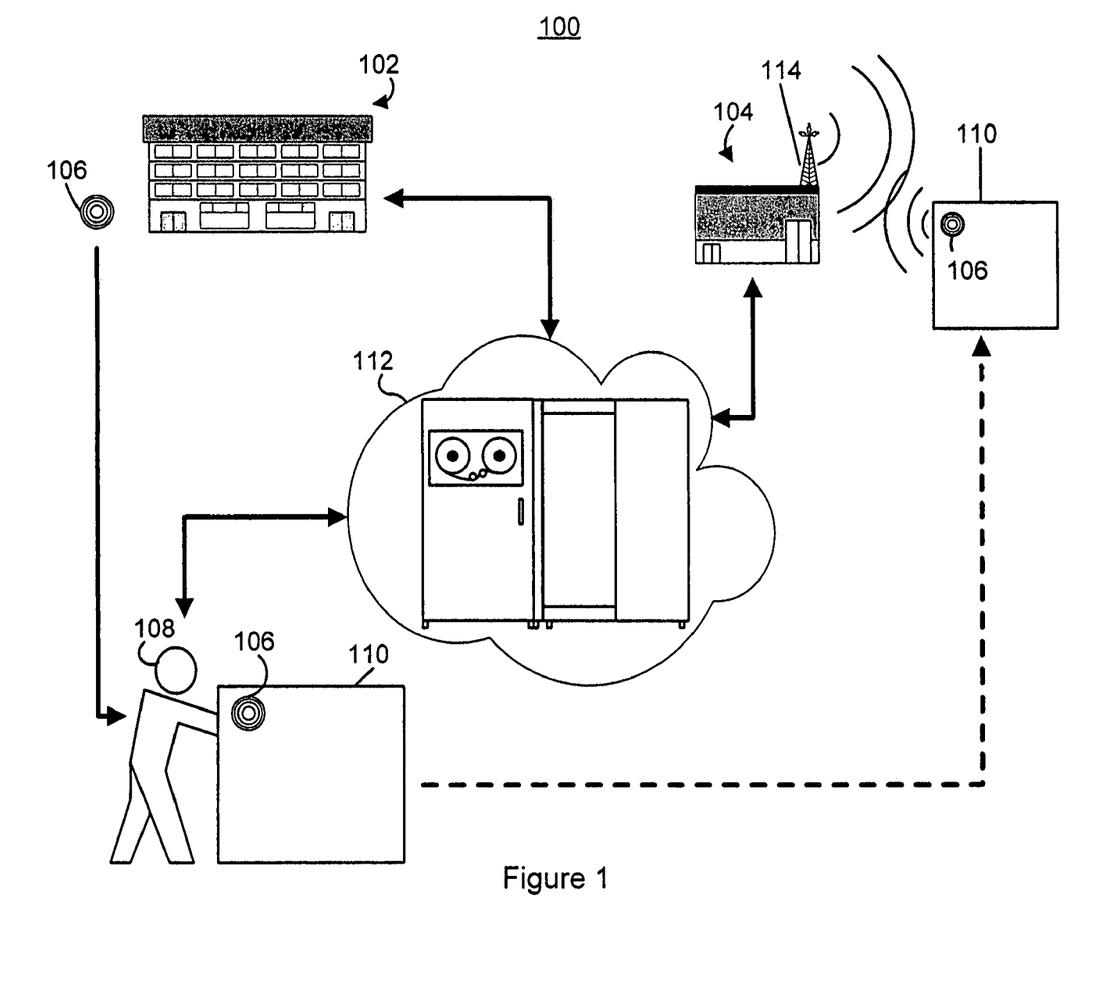
FIG. 1 illustrates one embodiment for an environment for a manufactured article recovery system according to the present invention.

FIG. 1 illustrates an environment for a manufactured article recovery system 100. The manufactured article recovery system 100 may be employed for identifying an owner of a manufactured article. The manufactured article recovery system may also be employed for identifying a mislaid or misappropriated manufactured article. The manufactured article may be a consumer item, an item of personal property, an item of business equipment, an item of inventory for a business, or the like.

The manufactured article recovery system 100 may include a radio frequency identification ("RFID") tag 106, and RFID reader 114 and a computerized network 112 of searchable information. A RFID tag issuing authority 102 may present the RFID tag 106 to an owner 108 of a manufactured article 110. The RFID tag issuing authority 104 may be a service organization that provides services to the owner 108. The RFID tag issuing authority 102 may be a surety, or an insurer, of the manufactured article 110. The RFID tag issuing authority 102 may provide the RFID tag 106 to subscribers, customers, or clients of its service, or the like. The RFID tag issuing authority 102 also may be a vendor, manufacturer, or distributor of the manufactured article 110. The RFID tag issuing authority 102 may provide the RFID tag 106 to its customers as a complimentary offering, or may sell the RFID tag 106 for value.

The owner 108 may desire to recover the manufactured article 110, in the event that manufactured article 110 has left the possession of the owner 108. For example, the manufactured article may have been mislaid by the owner 108 or misappropriated by another. The RFID tag issuing authority 102 may provide an RFID tag 106 to the owner 108. The RFID tag 106 may be placed on the manufactured article owned by the customer 108. The owner 108 receives one or more RFID tags 106 from the RFID tag issuing authority 102 and places the RFID tag 106 on the item 110 to be recovered in the event of the manufactured article 110 is mislaid or misappropriated.

The RFID tag 106 (described in greater detail with reference to FIG. 2 below) is configured to have sufficient amount of data storage capabilities to provide for storage of a unique identification code for each RFID tag 106. The unique identification code may be read with the RFID reader 114. One example of an RFID tag 106 is referred to as "Tag-It" and is provided by Texas Instruments, Inc. Another example of an RFID tag 106 is provided by Matrics, Inc. of Columbia, Md. and is referred to as "Smart Label." The RFID tag 106 may include a 96-bit or 128-bit memory, providing for up to $2^{96}$ or $2^{128}$ unique identification codes, respectively. Other designs are also available providing more or less unique identification codes. The unique code may be systemized according to standards that provide commonality for passing and utilizing the data stored by the RFID tag 106. One such standard is being developed by AutoID. The RFID tag 106 may be affixed to the manufactured article 110, thereby associating the unique identification code of the RFID tag 106 with the manufactured article 110.

The RFID tag issuing authority 102 may register the RFID tag 106 with the owner 108 to whom the RFID tag issuing authority 102 provided the RFID tag 106. The RFID tag issuing authority 102 may have information that may be used to identify the owner 108. The computerized network 112 may be configured to store a searchable database. The RFID tag 106 may be registered to or associated with the owner 108 by recording the unique identification code of the RFID tag 106 in the searchable database in the computerized network 112. The identification information of the owner 108 of the RFID tag 106 may be stored with the record associated with the unique identification code.

When the RFID tag issuing authority 102 provides a RFID tag 106 to the owner 108, the RFID tag issuing authority 102 may create a record in the database for the unique identification code of the RFID tag 106 and the identification information of the owner 108. The identification information may include a postal address, an e-mail address, a telephone number, any combination thereof, or any other information by which the owner 108 may be identified. The identification information also may include a description of the manufactured article to which the RFID tag 106 is associated. The database may be searched, and the identification information of the owner 108 determined, based on the query with unique identification code. In the event that the RFID tag issuing authority 102 provides multiple RFID tags 106 to the owner 108, the RFID tag issuing authority 102 may create a record in the database for each RFID tag 106 issued. With the record stored in the database on the computerized network 112, the RFID tag 106 may be considered registered to the owner 108. The owner 108 may place, or affix, the RFID tag 106 on the manufactured article 110 to recover the manufactured article 110 in the event that the manufactured article 110 leaves the owner's possession.

The owner 108 may also receive the RFID tag 106 prior to the RFID tag 106 being registered. The RFID tag issuing authority 102 also may provide the owner 108 with the RFID tag 106 prior to creating a data record or storing information in the computerized network 112. The owner 108 also may purchase, or otherwise obtain the RFID tag 106, prior to identification information of the owner 108 being stored in the database on the computerized network 112. If the RFID tag 106 is not registered to the owner 108 when the owner 108 receives the RFID tag 106, the owner 108 may communicate with the RFID tag issuing authority 102 to register the RFID tag 106. The RFID tag issuing authority 102 may receive the unique identification code and/or personal identification information from the owner 108. The RFID tag issuing authority 102 may create a record in the searchable database stored in the computerized network 112 as described above.

The owner 108 also may register the RFID tag 106. The owner 108 may communicate with the computerized network 112 to create a record in the searchable database for an RFID tag 106 associated with the manufactured article 110 owned by owner 108. The owner 108 may communicate with the computerized network 112 via any data communication mechanism. The owner 108 also may verbally communicate the unique identification code of an RFID tag and personal identification information to an operator who creates a data record in the database for the information. The owner 108 may register the RFID tag 106 through a telephone connection and may create a record and enter the unique identification code and/or personal identification information through the touch pad of a telephone. Similarly, the owner 108 may register the RFID tag 106 with a processor connected to the computerized network 112 through an open network connection such as the Internet. The owner may access the computerized network, and the database stored thereon, through a universal or uniform resource locator ("URL"). With the Internet connection, the owner 108 may create a record in the database and enter the unique identification code and/or personal identification information. The owner 108 may be prompted by the computerized network to enter the unique identification code and/or personal identification information.

To provide restricted access and security of the records stored by the database on the computerized network 112, the owner 108 may be instructed to enter or otherwise provide a password prior to having access to the database. The password may be created for the owner 108, or the password may be provided to the owner 108 with the RFID tag 106. The owner 108 also may select a desired password. When the password is entered and is verified, the owner 108 may be given access to the database to create a new record, or to modify an existing record associated with the owner 108. The record in the database also may be modified as the personal identification information of the owner 108 changes, or with changes in the ownership of the manufactured article 110 to which the RFID tag 106 is affixed.

A retrieval unit 104 may be any organization, authority, agency, corporation, person, entity, or the like that may be likely to obtain possession of, or otherwise locate or identify mislaid or misappropriated items. The retrieval unit 104 may be a community service organization such as a park district or a state, local, or municipal law enforcement organization. The retrieval unit 104 also may be a community shelter, a private security organization, a pawnbroker, a flea market operator, or the like. The retrieval unit 104 also may be a "lost and found" at a school, restaurant, theme park, museum, shopping mall, or similar public venues.

An RFID reader 114, or interrogator, is associated with the retrieval unit 104. The RFID reader 114 may be placed at a location where the retrieval unit 104 comes into possession of misplaced property. The RFID reader 114 also may be placed at a location for the retrieval unit 104 where mislaid property may regularly pass or be stored. The RFID reader 114 may be located at a reception desk, or counter, where the manufactured 110 article is received by the retrieval unit 104. The RFID 114 reader also may be located proximate a point of ingress or egress to a building, office, or warehouse of the retrieval unit 104.

The RFID reader 114 may passively read information stored by the RFID tag 106. The RFID reader 114 is configured to electronically read the unique identification code on the RFID tag 106 as the tag passes within range of the RFID reader 114. The RFID reader 114 may be configured to read data stored on the RFID tag 114 from a distance that is greater than other data storage media such as bar codes and magnetic media. Current RFID tags 106 may be read from several feet away, and up to 100 yards. The distance at which the RFID reader 114 may read the unique identification information from the RFID tag 106 may depend on the type of the RFID tag, the environment and any obstructions.

The RFID reader 114 reads the information stored in the RFID tag 106 affixed to the manufactured article 110 when the manufactured article 110 is within range of the RFID reader 114. The RFID reader 114 may read the unique identification code stored by the RFID tag 106 without an active or directional scan of the RFID tag 106. The RFID reader 114 need not be triggered with human intervention in order to read the unique identification code stored by the RFID tag 106. The RFID reader 114 may be disposed in a location that is not in a direct line-of-sight to the manufactured article 110 or the RFID tag 106. Because the RFID reader 114 does not need to be in the line-of-sight or in direct proximity of the manufactured article 110 and may be disposed up to several feet away from where the manufactured article may pass, the RFID reader 114 may be disposed at a remote location that is convenient for the retrieval unit 104 to provide for passive reading or recording of the information stored by RFID tags 106 affixed to the manufactured article 110.

The RFID reader 114 may have an internal processor coupled with a memory-or cache. The RFID reader 114 also may be coupled to an external processor having a memory or cache. In each case, the processor may be configured to communicate with the computerized network 112. The processor may be communicatively coupled with the computerized network 112 through a telephone communication, through an open network communication such as through an Internet connection, or the like. The processor may periodically communicate with the computerized network 112 to read or download one or more records associated with a mislaid or misappropriated item. The processor may download one or more complete or partial records. The downloaded records are stored in the memory. The records may include the identification codes and the identification information of the owner 108 associated with each mislaid or misappropriated article. The processor may periodically communicate with the computerized network 112 to read or download the records from the database. The processor also may be triggered by an event to communicate with the computerized network 112 to read the identification. For example, the processor may be configured to communicate with the computerized network once per day, once per week, or when an RFID tag is read. The memory may therefore provide a cache of the unique identification codes that have been identified as being associated with a mislaid or misappropriated item.

When the processor communicates with the computerized network 112, the computerized network may determine whether the memory may need to be updated. If it is determined that the memory needs to be updated, the processor may download records associated with only those identification codes that need to be added to the memory. The processor may also delete from memory a record for an identification code that is no longer considered lost or misappropriated. For example, the processor may communicate with the computerized network 112 to update the records for identification codes stored by the memory. The computerized network 112 may determine that the identification codes stored in the memory are not current. The computerized network 112 may communicate information to the processor related to identification codes to be deleted from memory and records for identification codes to be added to memory. The processor also may download a complete list of identification codes to replace the identification codes stored in memory.

When the RFID reader 114 reads a unique identification of an RFID tag within proximity of the RFID reader 114, the processor may search the memory for a match for the unique identification code read by the RFID reader 114. If the personal identification information of the owner 108 is stored with the record in the memory, the owner may be determined by locating a match in the memory. The processor may also provide an output to a user that a match has been found. The processor may also provide an output of the personal identification information of the owner 108.

When a match is found, the entry in the memory may be flagged. Information related to the flagged entry in the memory may be transmitted to the computerized network 112 to indicate that an RFID tag 106 associated with a mislaid or misappropriated item has been read. The computerized network 112 may locate the record in the database associated with the unique identification code and the owner 108 may be determined based on the located record. The computerized network 112 may generate a report including the personal identification information associated with the located record. The report may be communicated with the retrieval unit 104 and/or the RFID tag issuing authority 102. The report may be communicated by electronic mail ("e-mail"), through a facsimile, through a posting on a website, through a postal mailing, any combination thereof, or the like. Based on the report, the retrieval unit 104 and the RFID tag issuing authority 102 may determine the owner 108. The retrieval unit 104 or the RFID tag issuing authority 102 may notify the owner 108 that the manufactured article 110 having the RFID tag 106 was read by RFID reader 114 at the retrieval unit 104, and thereby notify the owner of the location of the misplaced manufactured article 110.

The computerized network 112 also may communicate the report to the owner 108. The location for the retrieval unit 104 that communicated the unique identification code may be determined by the computerized network 112. The computerized network 112 may communicate a notification to the owner 108. The notification may include the location for the retrieval unit 104 that read the unique identification code. The computerized network 112 may communicate the notification to the owner 108 by electronic mail ("e-mail"), by facsimile, through a posting on a website, through a postal mailing, any combination thereof, or the like.

The processor also may be configured to record the unique identification code read by the RFID reader 114. A request for a query of the database stored on the computerized network 112 may be generated based on the unique identification code. The request may be triggered as the result of a reading of one or more RFID tags 106 by the RFID reader 114. The request also may be generated periodically, such as once per day, week, month or any other convenient period. As a result of the receiving the request, a query may be conducted, a record in the database associated with the unique identification code may be located and the identification information associated with the owner stored in the record may be read. The owner 108 may be determined based on the identification information.

A report of the query may be generated by the computerized network 112. The report may include the identification information associated with the located record in the database. The report may be communicated with the retrieval unit 104 or the RFID tag issuing authority 102. The report may be communicated by electronic mail ("e-mail"), through a facsimile, through a posting on a website, through a postal mailing, any combination thereof, or the like. Based on the report, the retrieval unit 104 and the RFID tag issuing authority 102 may determine the owner 108. The retrieval unit 104 or the RFID tag issuing authority 102 may notify the owner 108 that the manufactured article 110 having the RFID tag 106 was read by RFID reader 114 at the retrieval unit 104, and thereby notify the owner of the location of the misplaced manufactured article 110. Based on the report, the retrieval unit 104 may return the manufactured article 110 to the owner 108.

The report also may be communicated with the owner 108 by the computerized network 112. Based on the query, the computerized network 112 may determine a location for the retrieval unit 104 that presented the query. As a result of the query, the record associated with the unique identification code may be determined. A notification to the owner may be generated and communicated with the owner 108 by the computerized network 112. The notification may include the location for the retrieval unit 104 that is presenting the request for the query. The computerized network 112 may communicate the notification to the owner 108 by electronic mail ("e-mail"), by facsimile, through a posting on a website, through a postal mailing, any combination thereof, or the like.

Figure 2:
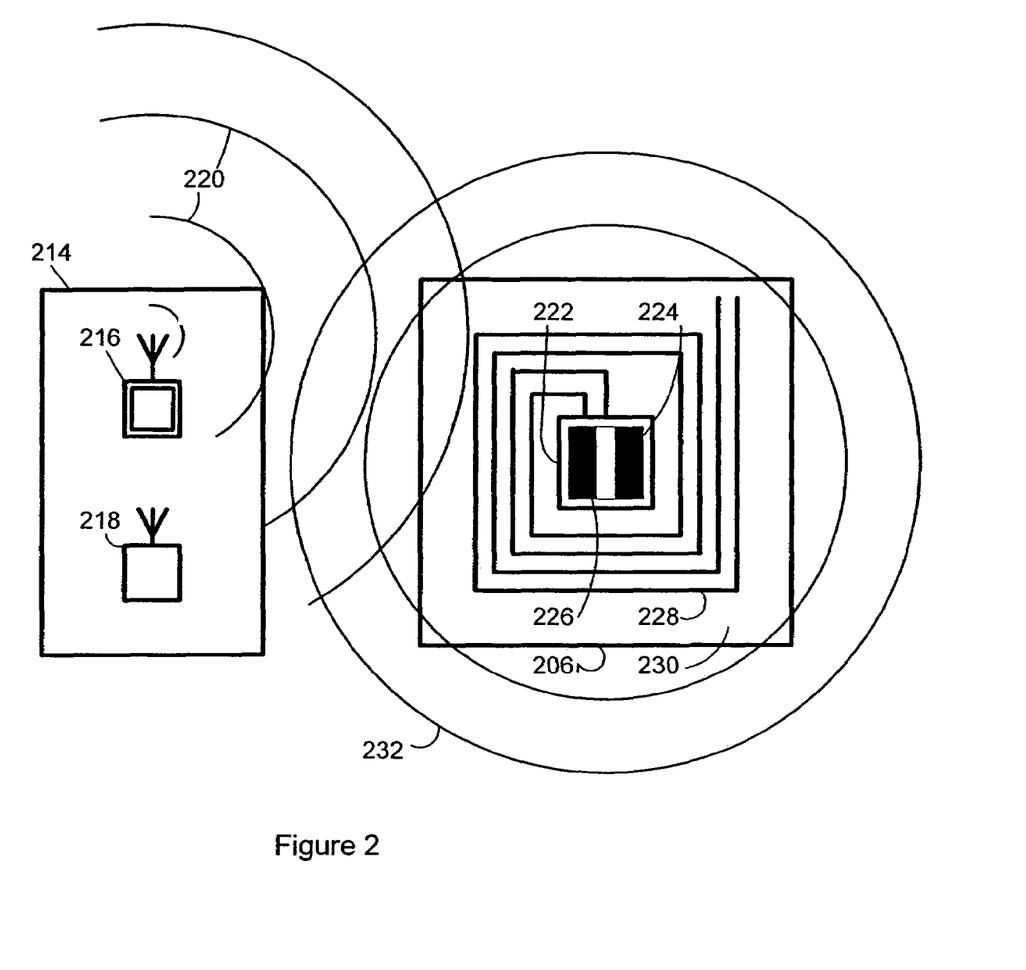
FIG. 2 illustrates a radio-frequency identification (RFID) reader and a RFID tag for the manufactured article recovery system of FIG. 1.

FIG. 2 illustrates an RFID reader 214 and a RFID tag 206 for a manufactured article recovery system 100. The RFID reader 214 is configured for two-way communications and includes a radio-frequency ("RF") transmitter 216 and a receiver 218. The RFID reader 214 may be configured to read multiple RFID tags 214 virtually simultaneously. Current RFID readers 214 may read up to 200 tags per second.

The RF-transmitter 216 is configured to emit a radio frequency ("RF") signal 220. The radio signal 220 is characterized by an oscillating frequency, power, and information. As such, the radio signal 220 may communicate power and information to the RFID tag 206.

The RFID tag 206 is relatively compact, and fairly inexpensive and may be provided in various sizes, shapes and arrangements. The RFID tag 206 includes an integrated circuit ("IC") 222 coupled to an antenna 228. The IC 222 and the antenna 228 may be disposed on a thin pliable media 230 that may be disposed on, affixed to, or placed in, on, or with a manufactured article 110. The pliable media 230 may be a film, card, ticket, tag, pressure sensitive label, or the like.

The RFID tag 206 may be generally categorized as either active or passive.

A passive RFID tag 206 operates based on power from the RF signal received from by the RFID reader 214, and therefore the IC 222 may operate without a separate power source. A passive RFID tag 206 may be smaller, lighter, and less expensive than an active RFID tag 206. An Active RFID tag 206 may include an internal power source (not shown) such as a battery that provides power for the operation of the IC 222. An active RFID tag 206 may also include read/write capabilities so that data stored by the RFID tag 206 may be rewritten and/or modified. An Active RFID tag 206 may generally provide for a longer read range than that of a passive RFID tag 206. In both active and passive RFID tags 206, the RFID reader 214 does not need to make contact with the RFID tag 206 to read the information and is not required to be visible, or in eyeshot, of the RFID reader 214 in order for the RFID reader 214 to read data stored on the RFID tag 206.

The IC 222 may include a communications circuit 224 and a non-volatile memory 226 for storage of data that may be read through the use of "RF" signals. The communications circuit 224 is coupled with the antenna 228 and the nonvolatile memory circuit 226. The communications circuit 224 is configured to receive the radio signal 220 and to transmit a data signal, which includes data stored in the non-volatile memory 226. The non-volatile memory 226 is configured to store the identification code that is unique to the RFID tag 206. The non-volatile memory 226 also may be configured to be programmed with information transmitted in a radio signal 220 and received by the communications circuit 224.

The antenna 228 sends and receives data as RF signals. The antenna 228 may be provided in various shapes and sizes. The antenna 228 may be an inductive coil antenna or a capacitive reactance type antenna. The radio signal 220 is received by the antenna 228. For a passive type of RFID tag, the radio signal 220 may provide sufficient power to activate the IC 222. In response to receiving the radio signal 220, the antenna 228 provides a voltage to the IC 222, which activates the IC 222. For an active type of RFID tag, the power source (not shown) also may provide a voltage for operating the integrated circuit. The IC includes a basic communication circuit for radio communication, and a memory circuit for data storage.

The communication circuit 224 reads the unique identification code stored in the non-volatile memory 226. The communication circuit 224 also transmits the data signal 232 that includes the unique identification code stored by the non-volatile memory 226. This process whereby the RFID tag 206 is activated, or interrogated, by the RFID reader 214, and in response, transmits an information signal back to the RFID reader 214, is commonly referred to as "backscattering."

The receiver 218 of the RFID reader 214 receives the data signal 230 transmitted by the RFID tag 206. The receiver 218 reads the unique identification code from the data signal 230. The identification code may then be processed by a processor (not shown) coupled to the receiver 218.

To mitigate a potential for a detection of an RFID tag of a reading of the information stored in the RFID tag 206 by an unauthorized individual, the RFID reader 214 may be programmed to transmit an authentication code when interrogating the RFID tag 206. The authentication code may be provided by the RFID issuing authority and programmed into a RFID reader 214. A RFID reader 214 having a programmed authentication code may be considered a certified reader.

The authentication code may be part of the radio signal transmitted by the RFID reader 214 and received by the RFID tag 206. The RFID tag 206 may read the authentication code received with the radio signal from the RFID reader 214. The IC 222 may verify the authentication code, and if so verified, the RFID tag 206 may transmit the unique identification code stored in the non-volatile memory 226. If the authentication code is not received or not verified as being from a certified reader, the RFID tag 206 will not transmit a signal back to the RFID reader 214. Therefore, the RFID tag 206 may be configured to respond only to certain RFID readers 214 that have been determined to be certified readers.

Figure 3:
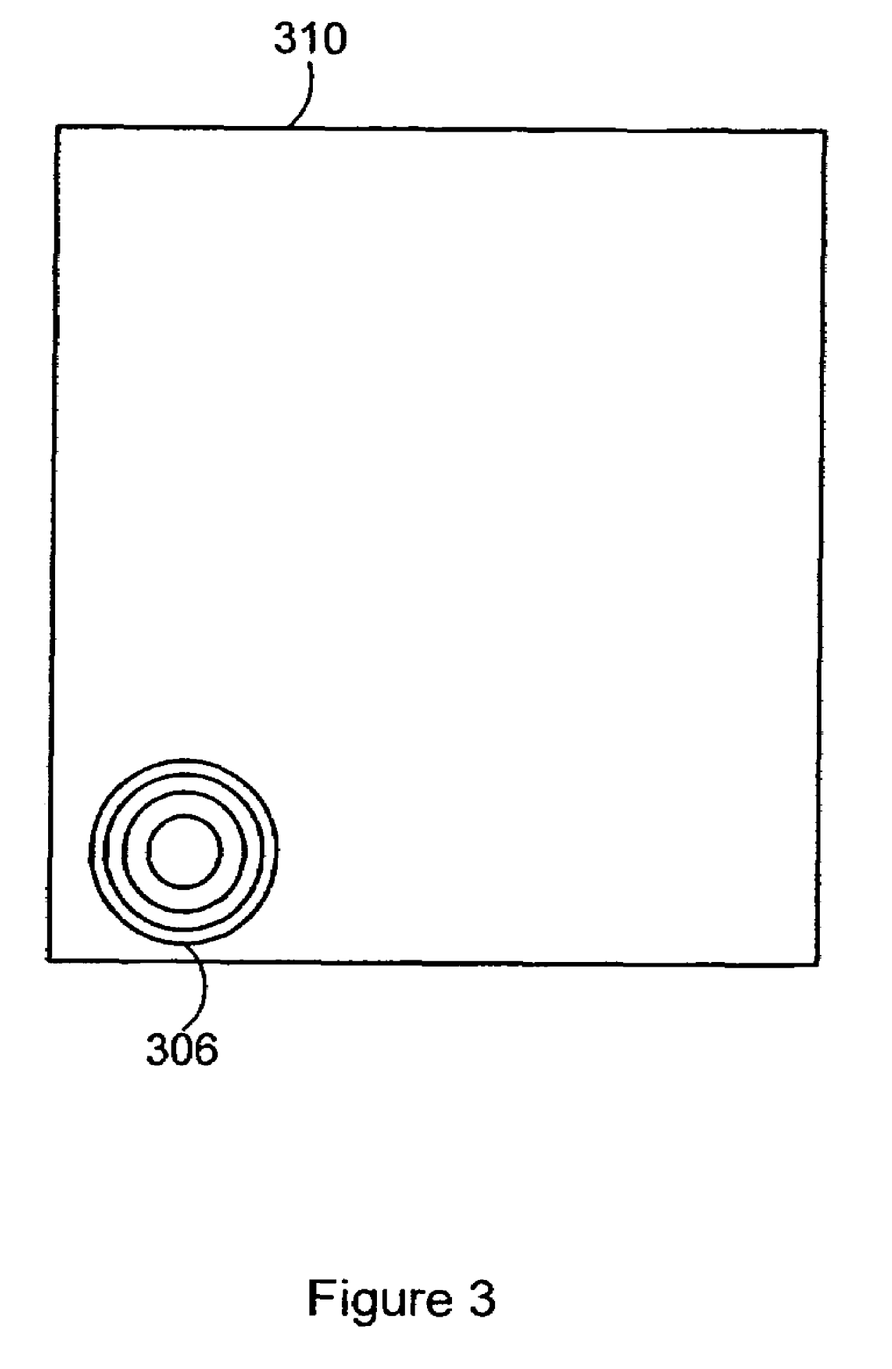
FIG. 3 illustrates an RFID tag of FIG. 2 disposed on a first manufactured article.

FIG. 3 illustrates an RFID tag 306 disposed on a manufactured article 310. The RFID tag 306 is configured to be affixed to, installed on, or placed in, on, or with the manufactured article 310 The RFID tag 306 also may be configured to be concealed internal to a housing for the manufactured article 310. The manufactured article 310 may be an item of personal property such as an appliance, a home electronic device, television, computer, computer software, telephone, VCR, DVD player, camera, personal digital assistant, kitchen appliance, home furnishing, sporting equipment, medical device, personal grooming device, lawn and garden equipment, hardware, a hand tool, a power tool, bicycle, motorcycle, car, lawn mower, tractor, personal watercraft, boat, scooter, all-terrain vehicle, set of golf clubs, and the like. The manufactured article 310 also may be an item of inventory such a manufacturing component, or an item of business equipment such as an office supply.

The RFID tag 306 may be configured to be disposed on the manufactured article 310 in an inconspicuous location. The RFID tag 306 may be located so as to mitigate a possibility that the RFID tag 306 may be identified by another and to prevent tampering with the RFID tag 306. For a consumer electronic device, the RFID tag 306 may be placed internal to a housing for the device. The RFID tag 306 may also be concealed in the form of a decorative decal or label that may be affixed to a housing on the manufactured article 310 and not readily identified as a RFID tag 306.

Figure 4:
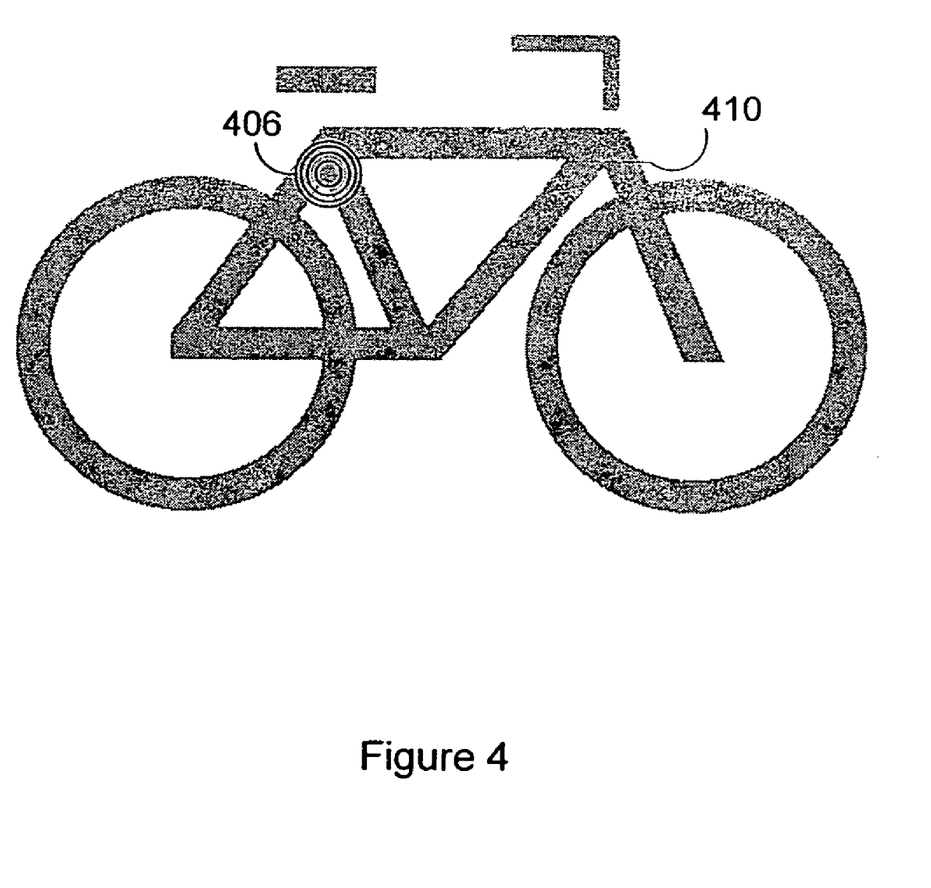
FIG. 4 illustrates an RFID tag of FIG. 2 disposed on a second manufactured article.

FIG. 4 illustrates an example of an RFID tag 406 disposed on a bicycle 410. The RFID tag 406 may be configured as a pressure sensitive decal that may be placed on the bicycle 410. The RFID tag 406 may have artwork that disguises the RFID tag 406 as a label that may be ordinarily located on the bicycle, such as artwork resembling that of a manufacturer or vendor of the bicycle, or bicycle related accessories. The RFID tag 406 also may be configured to be placed inside a hollow interior of a frame of the bicycle 410.

Figure 5:
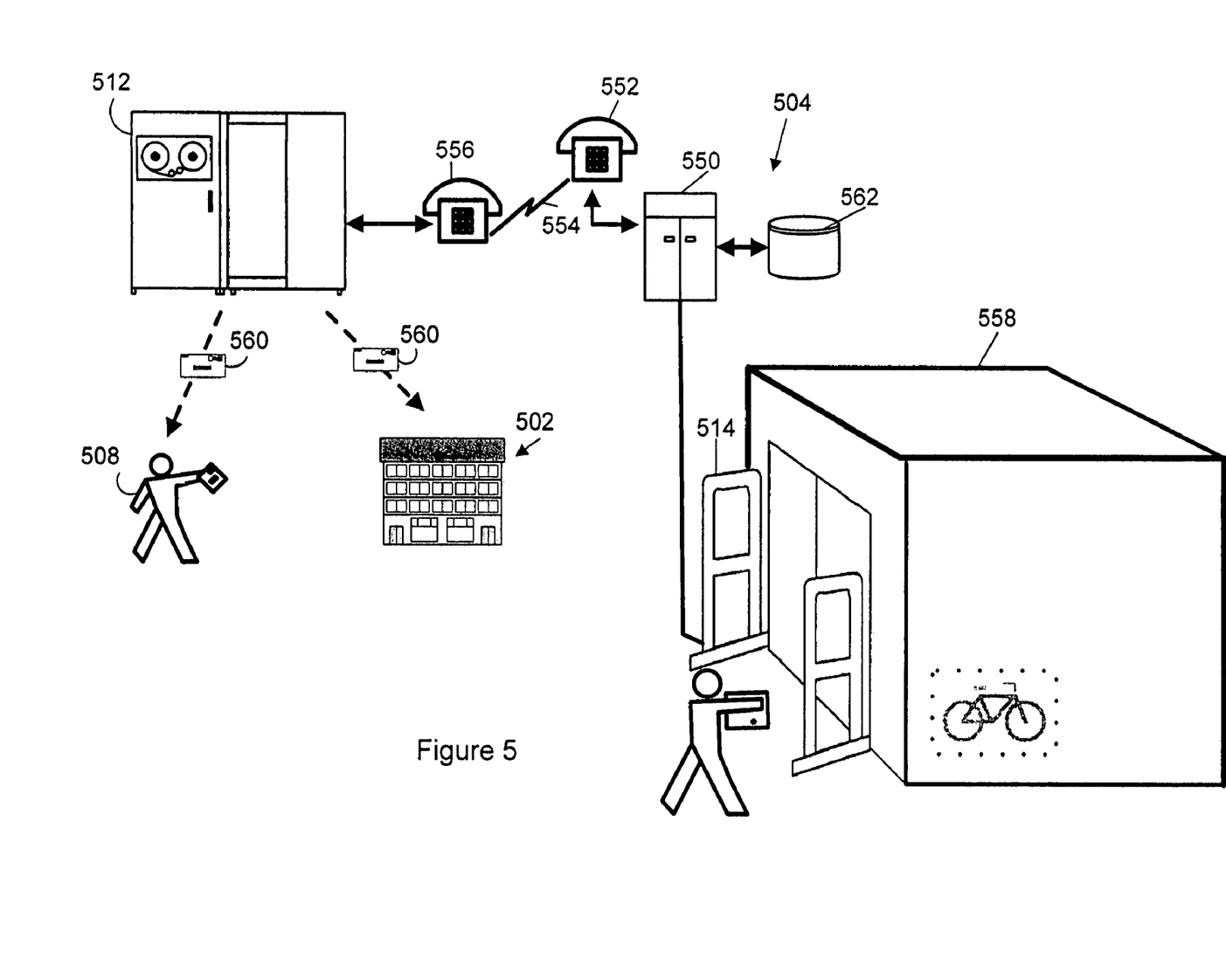
FIG. 5 illustrates a second embodiment for an environment for a manufactured article recovery system.

FIG. 5 illustrates an environment for a retrieval unit 504 having an RFID interrogator 514. The retrieval unit 504 may be a community service organization such as a state, local, or municipal law enforcement organization. The retrieval unit 504 may have an impound or a "lost and found" 558 for storage of items handled by the retrieval unit 504. In an example for a municipal law enforcement agency 504, the impound 558 may be located within a central office of the law enforcement agency 504. A misplaced manufactured article 510 maybe located by or surrendered to the law enforcement agency 504. A patrolperson for the law enforcement agency 504 also may reclaim the manufactured article 510 for the law enforcement agency 504. In the event the law enforcement agency 504 comes in to possession of the manufactured article 510, the manufactured article 510 may be placed in the impound 558.

An RFID reader 514 may be disposed at a location where the manufactured article 510 may regularly pass, or stored, while in the possession of the retrieval unit 504. The RFID reader 514 may be located proximate a point of ingress or egress 560 to the impound 558, or proximate a passageway. The RFID reader 514 also may be located at a desk or counter where the manufactured article is placed into inventory of the retrieval unit 504.

When the manufactured article 510 having an RFID tag 506 is within range of the RFID reader 514, the RFID reader 514 may read the unique identification code of the RFID tag 506. Because the RFID reader 514 may read the RFID tag 506 without human intervention or triggering, a clerk or other employee at the impound need not interact with the manufactured article 510, the RFID tag 506, or the RFID reader 514 in order for the RFID reader 514 to operate. Therefore, as a manufactured article 510 having an RFID tag 506 is taken into possession by the retrieval unit 504, the unique identification code may be read without active intervention or participation by the retrieval unit 504 and the unique identification code may be read automatically.

The RFID reader 514 may be coupled with a processor 550. The processor 550 may be external to the RFID reader 514. The processor 550 also may be integral with the RFID reader 514. The processor may be coupled to a memory 562 configured to storage one or more unique identification codes. The processor 550 may communicate with the computerized network 512 through a communication connection 554. The communication connection 554 may be with a telephone connection via modems 552, 556, through an open network communication such as the Internet, through a facsimile transmission, or the like. The communication connection may allow for the transmission by and between the computerized network 512 and the processor 550.

The processor 550 may be configured to read or download information from the computerized network 512. The downloaded information may be stored in the memory 562. The information may include one or more unique identification codes where each identification code is associated with a misappropriated or mislaid item. The downloaded information also may include personal identification information associated with each unique identification code downloaded. The processor 550 may periodically communicate with the computerized network 512 to download the information or may be triggered to communicate with the computerized network 512 based on an event. For example, the processor may communicate with the computerized network once per day, once per hour, when an RFID tag is read, or the like. The processor may download updated information or may download all current information. For example, computerized network 512 and/or the processor may determine that only identification codes not previously downloaded and stored in the memory 562 need to be downloaded. The computerized network 512 and/or the processor also may determine that identification codes previously downloaded and stored in the memory 562 that are no longer associated with a mislaid or misappropriated item need to be deleted from the memory 562. The computerized network 512 and/or the processor may determine that the identification codes stored in the memory 562 will be rewritten, and thereby download a complete list of unique identification codes.

Based on the unique identification code read by the RFID reader 514, the processor 550 may search the memory 562 for a match for the unique identification code. If a match is determined, the processor 550 may provide an output indicating that a match has been located. The processor 550 also may provide an output for the personal identification information associated with the matched unique identification code. The processor 550 also may communicate the matched unique identification code to the computerized network 512 to indicate that the corresponding RFID tag was read by the RFID reader 514. The computerized network 512 may generate a report 560 including personal identification information associated with the matched unique identification code. The report 560 may be communicated with the retrieval unit 504 and/or RFID tag issuing authority 502. The computerized network 512 also may be configured to transmit the report to the owner 508 of the manufactured article 510. The report 560 may be communicated by electronic mail ("e-mail"), through a posting on a website, through a postal mailing, by a facsimile transmission, any combination thereof, or the like. Based on the report, the retrieval unit 504 and the RFID tag issuing authority 502 may determine the owner 508.

The processor 550 also may generate a request for a query of the database based on the unique identification code read by the RFID reader 514. The query may be triggered as the result of a reading of one or more RFID tags 506 by the RFID reader 514. The query also may be periodically triggered such as once per day, week, month or any other convenient period.

The processor 550 may communicate the query to the computerized network 512 via the communication connection 554. When the RFID tag. 506 is registered as described above, a record exists in the searchable database stored by the computerized network 512. The computerized network 512 receives the query from the processor 550 and generates a search of the database for the record associated with the unique identification code.

The computerized network 512 may generate a report 560 of a result of the search. The report 560 may be communicated with the retrieval unit 504 or RFID tag issuing authority 502. The report 560 may be communicated by electronic mail ("e-mail"), through a posting on a website, through a postal mailing, by a facsimile transmission, any combination thereof, or the like. When a record associated with the unique identification code is located, the report 560 may include the identification information associated with the record. Based on the report, the retrieval unit 504 and the RFID tag issuing authority 502 may determine the owner 508. When a record associated with the unique identification code is not located in the database, the report 560 may include notification that the search did not result locating any such record.

The computerized network 512 also may be configured to transmit the report to the owner 508 of the manufactured article 510. When communicating the request for the query to the computerized network 512, the retrieval unit 514 may also communicate information related to the retrieval unit 514. Such information may include a time and date the query is made, a time and date that the RFID tag 506 was read by the RFID reader 514, and a location for the retrieval unit 514. When a record associated with the unique identification code is located, the computerized network 512 may read the identification information associated with the record, and determine the identification of the owner 508. The computerized network 512 may generate the report 560 based on the information related to the retrieval unit 504 that generated the query. The computerized network 512 also may transmit the report 560 to the owner 508. The report may be transmitted by facsimile, by e-mail, by a posting on an Internet website, by postal mail, any combination thereof, or the like. The owner 508 receives the report, and is thereby informed of the location of the manufactured article 510.

Figure 6:
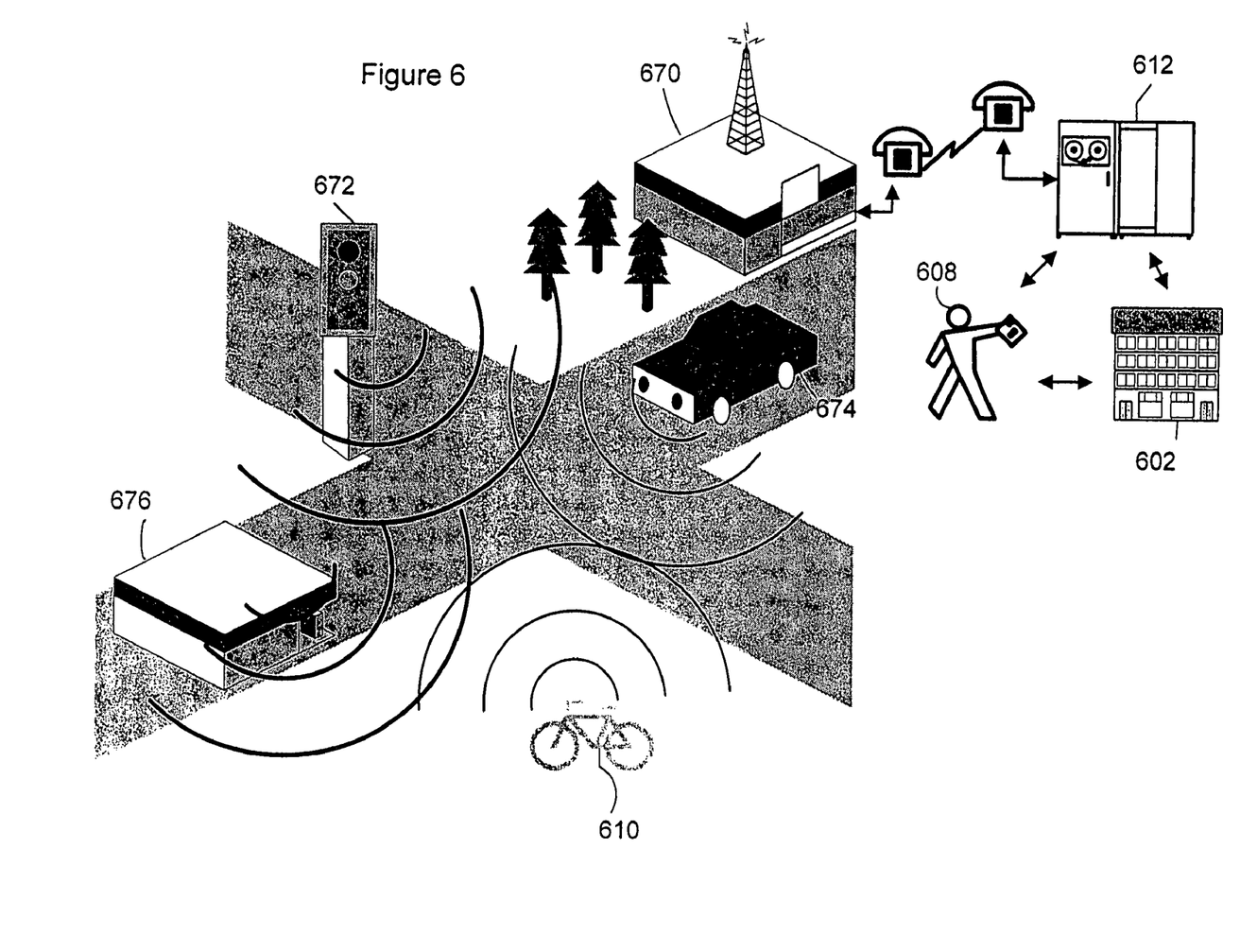
FIG. 6 illustrates a third embodiment for an environment for a manufactured article recovery system.

FIG. 6 illustrates a retrieval unit 604 for a manufactured article recovery system 600 having an RFID reader disposed within a community. The retrieval unit 604 may be a state, local, or other municipal law enforcement agency, a community park district, a toll authority, a highway authority, or any other government entity. The retrieval unit 604 also may be a private security organization.

An RFID reader as described above may be disposed with various properties of the retrieval unit 604. The RFID reader is located so that it may interrogate RFID tags on a manufactured article 610 that is open to the public such as along the side of a road or in a car parked along the road. The RFID reader may be disposed on a traffic control signal 672, or a toll booth 676. When a manufactured article 610 is within range of the RFID reader disposed on the traffic control signal 672 or the toll booth 676, the RFID tag may be interrogated and the unique identification code read. The unique identification code may be recorded by a processor coupled to the RFID reader. The processor may generate a request for a query based on the unique identification code.

The RFID reader also may be disposed on a mobile vehicle such as a patrol car 674, or a patrol bicycle, for the retrieval unit 604. As the patrol car 674 is operated, the RFID reader disposed therein interrogates the RFID tags within range of the RFID reader. The RFID reader may be coupled to a processor having a memory configured to store unique identification codes and associated personal identification information. The memory may be configured to store unique identification codes downloaded from the computerized network as described above. The processor may search the memory for a match for unique identification code read by the RFID reader as previously described.

The memory also may be configured to store unique identification code read by the RFID reader. The processor may generate a request for a query based on unique identification codes. The processor may communicate the query to the computerized network 612 via a wireless connection. The processor also may download the unique identification codes read by the RFID reader to a central processor on a periodic basis such as at the end of a shift for a patrolperson. The central processor may be located at a central office or building 670 for the retrieval unit 604. The central processor also may be coupled to other RFID readers or other processors that are coupled to RFID readers. The central processor may generate a request for a query based on the identification codes downloaded from the RFID reader of various patrol cars 674 in a fleet for the retrieval unit 604.

An owner 608 of the manufactured article 610 may obtain an RFID tag, and register the RFID tag as described with reference to FIG. 1 above. If the manufactured article 610 having the RFID tag affixed thereto is mislaid or misappropriated, the owner 608 may report to the RFID tag issuing authority 602 that the item has been lost. In an event where the RFID tag issuing authority 602 is an insurer for the manufactured article 610, such a report may be part of a claim made by the owner 608 against an insurance policy for the manufactured article 610. As a result of the report from the owner 610, the record in the database associated with the RFID tag affixed to the manufactured article 610 is flagged to indicate that the RFID tag has left the possession of the owner 610. The flagged record may be queued for downloading to a RFID reader. The owner 608 also may communicate with the computerized network 612, as described above, to flag the record in the database associated with the RFID tag on the mislaid or misappropriated manufactured article 610 as having left the possession of the owner.

Whether a unique identification code is associated with a mislaid or misappropriated manufactured article may be determined based on a location of the RFID reader. A unique identification code read by an RFID reader disposed at the impound 558 may be determined to be associated with a mislaid or misappropriated manufactured article 610. An RFID reader that is located in the community may interrogate an RFID tag and read a unique identification code associated with a manufactured article 610 that is in the owner's possession, as well as a manufactured 610 article that has been mislaid or misappropriated. A request for a query based on a unique identification code read by an RFID reader located in the community, therefore, may include a unique identification code associated with a manufactured article that is not mislaid or misappropriated. Therefore, information related to a location of the RFID reader may be included with a request for a query of the computerized network 612. The information also may include information identifying the retrieval authority requesting the query. The information also may include criteria related to whether to search all records in the database or a selected group of records.

A query of only those records that have been flagged as associated with a mislaid or a misappropriated manufactured article 610 may be performed based on the location of the RFID reader that read the unique identification code. A query based on a unique identification code read by a RFID reader in the community may be confined only to those records that have been flagged, in order to locate a record in the database that is associated with an RFID tag that has been reported as mislaid or misappropriated. A query based on a unique identification code read by an RFID reader at an impound also may be confined to flagged records, and also may relate to records that have not been flagged. The computerized network 612 may therefore generate a report that includes information related to items that may be verified as mislaid or misappropriated.

Figure 7:
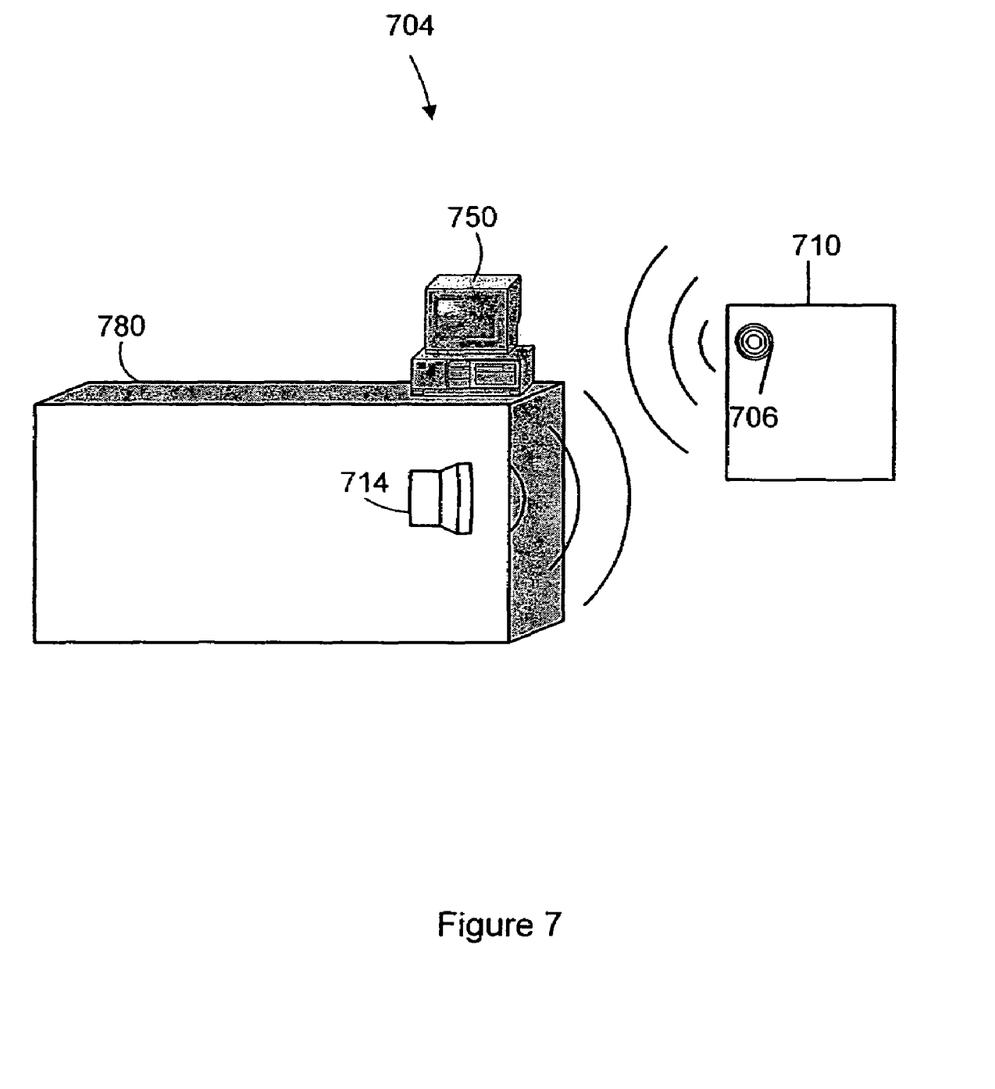
FIG. 7 illustrates a fourth embodiment for an environment for a manufactured article recovery system.

FIG. 7 illustrates a retrieval unit 704 for a manufactured article recovery system 100 having an RFID reader 714 disposed at a private business. The retrieval unit 704 may be a pawnshop, a flea market, or other private entity where manufactured articles may be resold or hocked. An RFID reader 714 may be located so that it may interrogate an RFID tag 706 on a manufactured article 710 brought to the retrieval unit 704 for resale. The RFID reader 714 may be located at a point of ingress or egress to the retrieval unit 704, or may be located at a counter 780 where a resale transaction may occur.

The RFID reader 714 may be coupled with a processor 750. The processor 750 may be configured to receive a unique identification that is read by the RFID reader 714. The processor 750 search a memory of downloaded unique identification codes to locate a match for an identification code identified as being associated with a mislaid or misappropriated item, as described above. The processor 750 also may generate a query of the computerized network (not shown) as described above, based on the unique identification code read by the RFID reader 714. Based on the query, the computerized network may search the database to determine whether the unique identification code is associated with a manufactured article that has been recorded as mislaid or misappropriated. A report may be generated by the computerized network and communicated with the processor 750. The processor may display the report to an attendant at the retrieval unit 704. Based on the report displayed by the processor, the attendant may determine whether the manufactured article 710 bearing the RFID tag is mislaid or misappropriated. The attendant also may estimate whether the manufactured article 710 is in the possession of the rightful owner.

Figure 8:
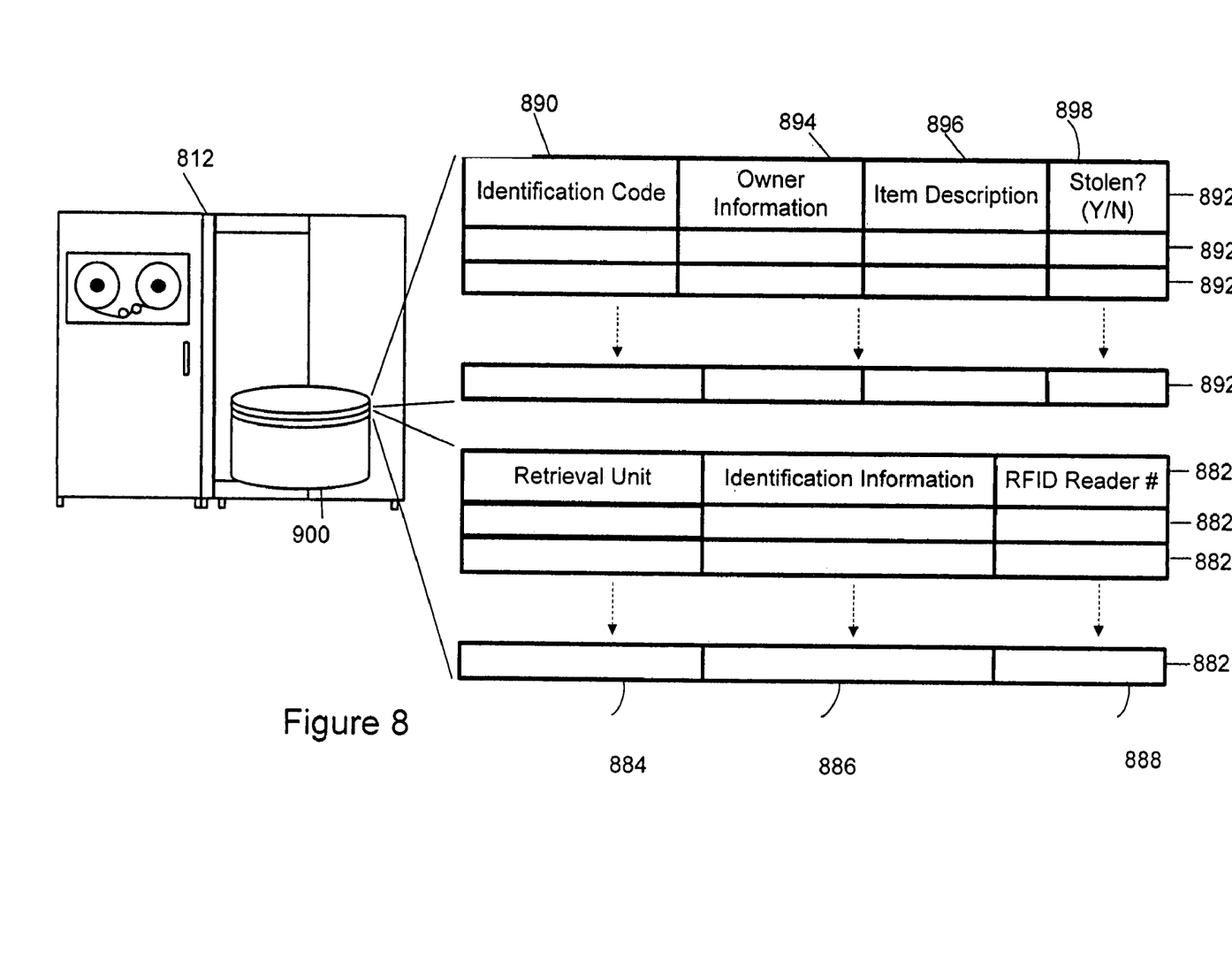
FIG. 8 illustrates records for a searchable database for a manufactured article recovery system.

FIG. 8 illustrates a computerized network 812 of a manufactured article recovery system 800. The computerized network 812 may be configured to store a searchable database 900. The database 900 may be configured to store one or more records 892 of information. Each record 892 may include a field related to a unique identification code 890 stored by an RFID tag. The record 892 also includes a field for identification information 894 for an owner with Whom the unique identification code (RFID tag) is associated. The record 892 also may include a field 896 for a description of the item to which the RFID tag is associated and a field 898 related to whether a status of whether the manufactured article related to the RFID tag associated with the record 892 has been recorded as mislaid or misappropriated. The record 892 also may include other fields for recording data related to the identification of a manufactured item, an owner, an RFID tag, a unique serial number, or the like.

The database 900 is configured to be queried or searched based on the various fields 890, 894, 896, 898. The query may include one or more search criteria. The database 900 may be searched to locate a record 892 associated with a unique identification code. When a record 892 associated with the unique identification code is located, the computerized network 812 may generate a report based on the results. The report may indicate one or more records associated with the search criteria. The report also may indicate that the search did not result in locating a record based on the search criteria.

The database also may be searched based on whether the record 892 has been flagged as related to a mislaid or misappropriated. The computerized network 812 may be configured to search only those records 892 having an entry indicating that the item is mislaid or misappropriated in the status field 898. The computerized network 812 also may be configured to search all records 892 based on a unique identification code, and determine whether a located record 892 has been identified as related to a mislaid or misappropriated manufactured article based on the entry in the status field 898. The report generated by the computerized network 812 may include all results of the query, or may include only records 892 having an entry in the status field indicating that the record is associated with a mislaid or misappropriated manufactured article. The report may also include information that a record has not been located.

The database may also be downloaded to a memory or cache associated with an RFID reader. The database 890 may be downloaded in whole or in part. For example, records 892 in the database 890 that have been flagged as being related to a lost or stolen item, may be downloaded to a cache. The downloaded records 892 may include the unique identification field 890, the owner identification field 894, the item description field 896, any combination thereof, or the like. The records 892 that are downloaded may include only records that have been updated or altered since a previous download to the memory, or may include all records regardless of a previous download to the memory. The download also may include updating records 892 stored in the memory to include any change in the status of a previously downloaded record 892. When a unique identification code is read by the RFID reader to which the database 890 has been downloaded, the RFID reader may search the memory for the unique identification code. The owner may be determined based on the information in the downloaded record 892, or based on the record 892 stored in the database 890. The item to which the RFID tag is associated may be identified based on the information in the downloaded record 892, or based on the record 892 stored in the database 890.

The database also may store information related to a retrieval unit and RFID readers. The database may store a record 882 for an RFID reader in the manufactured article recovery system. The record may include a field 884 for the retrieval unit to which the RFID reader is associated, a field 886 for information related to a location for the retrieval unit, and a field 888 for a unique identification number for the RFID reader. When a request for a query is received by the computerized network 812, the records for the RFID reader 882 may be searched to determine information associated with the retrieval unit transmitting the request. Based on the information stored in the record 882, the computerized network may search all or a portion of the records 892 for the unique identification numbers.

By way of example, the computerized network 812 may receive a request for a query from a mobile RFID reader that read a unique identification number. The computerized network may also receive with the request a serial number of the RFID reader. The computerized network may search the database 900 for the record 882 associated with the serial number of the RFID reader and determine that the request for the query is being made by a mobile RFID reader. The computerized network 812, may thereby, conduct a query of only those records 892 having an entry in the field 898 as being associated with a manufactured article that has been identified as lost or stolen.

Based on the disclosed manufactured article recovery system, one can implement changes to the system to provide for recovery of mislaid or misappropriated manufactured articles in numerous environments. One example may relate to locating an RFID tag on an article of clothing, such as an expensive fur. An RFID reader may be located a dry cleaning establishment, a Laundromat, or at a storage location for such clothing. The RFID reader may be located at the counter or at a doorway may be used to interrogate each RFID tag disposed brought to the drycleaner. A processor may read the unique identification code, and query a database or a memory of downloaded unique identification codes for a matching code. If the owner's identification information has been entered into the database, the processor may determine the owner's information. In addition the database may be configured to store the owner's preferences, and the type of article of clothing for each RFID tag. Based on a query of the database, the processor may generate a shop order to have the articles of clothing cleaned, and an invoice or receipt for the customer. The RFID tags may be used to track the clothing through a cleaning process, and in an inventory for the drycleaner and recover the item should it be mislaid during the dry-cleaning process.

Some of the changes that can be implemented include disposing an RFID reader at a border or customs checkpoint. An RFID tag on a manufactured article will be detected at the checkpoint, the database or memory queried, and a report provided to the agent or attendant regarding whether a manufactured article at the checkpoint has been reported as mislaid or misappropriated.

Another change may include providing a patrol officer with a handheld device or mobile device equipped with an RFID reader to scan parked cars, or individuals stopped by the patrol officer. The RFID reader may be coupled with a portable communications device, which may be used to communicate a unique identification code, or the query to the computerized network. The communications device may be used to download unique identification codes to a memory of the handheld device. The portable communications device also may be configured to receive a report of the results of a query of a database, so that the patrol may determine whether a consumer item has been reported as mislaid or misappropriated.

Another change may be to locate an RFID reader at an auction house for antiquities and artwork. An RFID tag may be concealed on antiquities or other pieces of art so that if they are later located at the auction house, the auctioneer may determine whether the item has been identified as mislaid or misappropriated. Similarly, the artwork may be interrogated by other RFID readers to verify authenticity of the artwork.

While various embodiments of the invention have been describe, it will be apparent to those of ordinary skill in the art that many more embodiments and implementations are possible within the scope of the invention. Accordingly, the invention is not to be restricted except in light of the attached claims and their equivalents.

What is claimed is:

1. A method for identifying an entity associated with a manufactured article, comprising the steps of:
    associating a unique identifier with a manufactured article;
    storing a data record in a searchable database having a plurality of data records, the data record including the unique identifier and information identifying an entity associated with the manufactured article;
    wirelessly reading the unique identifier with a wireless interrogator positioned at an identifiable location, the interrogator being configured to broadcast electromagnetic waves and to receive the unique identifier in response to a broadcast, the unique identifier being provided in response to the broadcast electromagnetic waves;
    querying the searchable database based with the unique identifier received by the wireless interrogator; and
    reporting to the associated entity, the location of the manufactured article according to the identifiable location stored in a data record located in response to querying the database.

2. The method of claim 1 where the unique identifier is associated with an RFID tag and the interrogator is a RFID reader.

3. The method of claim 2 where the step of querying comprises:
    matching the unique identifier read by the RFID reader to the data record in the database corresponding to the unique identifier; and
    reading the information identifying the entity in the matched data record.

4. The method of claim 1 where the step of storing comprises permitting secured access to the database by the entity to enter the unique identifier and information identifying the entity.

5. A method for recovering a manufactured article, comprising:
    storing personal identification information for an individual in an electronically searchable database;
    associating at least one unique identifier with the personal identification information,
    receiving information identifying a unique identifier using electromagnetic waves;
    identifying the individual based on the received information identifying the unique identifier; and
    reporting the receipt of the information identifying the unique identifier to the identified individual according to the stored personal identification information.

6. The method of claim 5 where the step of identifying comprises:
    querying the electronically searchable database to locate a data record associated with the unique identifier; and
    identifying the individual based on personal identification information in a data record associated with the located data record as a result of the query.

7. The method of claim 5 where the electronically searchable database is accessible via open network computer architecture.

8. The method of claim 5 where the unique identifier is associated with an RFID.

9. The method of claim 8 where the step of receiving information comprises:
    positioning an RFID reader proximate a pedestrian thoroughfare;
    reading the unique identifier of an RFID tag positioned with a manufactured article with the RFID reader.

10. The method of claim 5 further comprising permitting access to the electronically searchable database to the individual for data entry.

11. A system for reclaiming a misplaced manufactured item, comprising:
    a distributed computer-based network of information;
    a database being accessible via the distributed network, the database including a plurality of data records each including an identification code and information identifying an individual; and
    at least one interrogator in communication with the distributed network and configured to wirelessly read information related to an identification code stored in a electronic memory, the identification code being accessible from the memory in response to electromagnetic waves being broadcast by the interrogator;
    wherein at least one computer of the distributed network generates a query of the database in response to receiving information related to an identification code read by the interrogator, and wherein at least one computer of the distributed computer network reports a result of query to an individual identified as a result of the query by a mode identified as a result of the query.

12. The system of claim 11 where the query of the database is initiated as a consequence of the identification code being read by the at least one interrogator.

13. The system of claim 11 where unique identifier is associated a RFID tag provided to the individual by an authority that maintains the records of the database and the interrogator comprises a RFID reader positioned proximate to a communal thoroughfare.

14. The system of claim 11 where the distributed computer-based network comprises the Internet.

15. A computer readable medium having stored thereon computer executable instructions to cause a computer programmed thereby to perform a method for reporting a location of a recovered manufactured item, wherein the method of reporting comprises:
   storing data records in a searchable database, each record including a unique identification code cross-referenced to information related to at least one entity associated with the manufactured item, the unique identification code associated with and readable from the manufactured item;
   querying the database with a unique identification code read from a tag positioned with the manufactured article, the unique identification wirelessly emanating from the tag in response to a wireless interrogation of the tag;
   identifying an entity associated with the manufactured item according to identifying a record in the database associated with the unique identification code; and
   reporting the location of the manufactured item to the entity according to information for the entity in the database.

16. The computer readable medium of claim 15 further comprising flagging a data record associated with a manufactured article reported as being misplaced.

17. A method for locating a manufactured article, comprising:
   downloading one or more data records to a local electronic data storage from a main database, the data records being associated with manufactured articles, each downloaded data record including a unique identification code and data indicating the associated manufactured article has been mislaid;
   searching the downloaded records according to a unique identification code read from the manufactured article;
   in response to searching the downloaded records, identifying a person associated with manufactured article; and
   reporting a location of the manufactured item to the person according to a reporting location stored in a corresponding record of the downloaded records.

18. The method of claim 17 where the step of identifying comprises:
   locating at least one record of the downloaded records associated with a unique identification number; and
   identifying the person based on the located record.

19. The method of claim 18 where the unique identification code read from the manufactured article is read by a RFID reader from a RFID tag positioned with the manufactured article.

20. The method of claim 17 further comprising the steps of:
   receiving information identifying the manufactured article as an item to be located; and
   flagging the record in the searchable database corresponding to the unique identification code for the manufactured article.

* * * * *